United States Patent [19]
Graefe

[11] 3,765,250
[45] Oct. 16, 1973

[54] MULTIPLE ROTATION GYROSCOPE
[75] Inventor: Albert D. Graefe, Flushing, N.Y.
[73] Assignee: Sperry Rand Corporation, Great Neck, N.Y.
[22] Filed: Aug. 25, 1964
[21] Appl. No.: 392,676

[52] U.S. Cl. ........................... 74/5, 74/5.7
[51] Int. Cl. .................. G01c 19/02, G01c 19/06
[58] Field of Search ................ 74/5, 5.37, 5.7

Primary Examiner—Robert F. Stahl
Attorney—Samuel C. Yeaton

[57] ABSTRACT
In gyroscopic apparatus, a. an inertial element having a first axis of inertial symmetry and a second axis perpendicular to said first axis,
b. the moment of inertia of said element with respect to said second axis being greater than that with respect to said first axis,
c. said inertial element being supported for rotation about said first and second axes simultaneously,
d. means for simultaneously rotating said inertial element about said first axis at a first angular velocity component and about said second axis at a second angular velocity component appreciably greater than said first angular velocity component for providing a spatial reference.

18 Claims, 9 Drawing Figures

INVENTOR.
ALBERT D. GRAEFE
BY
ATTORNEY

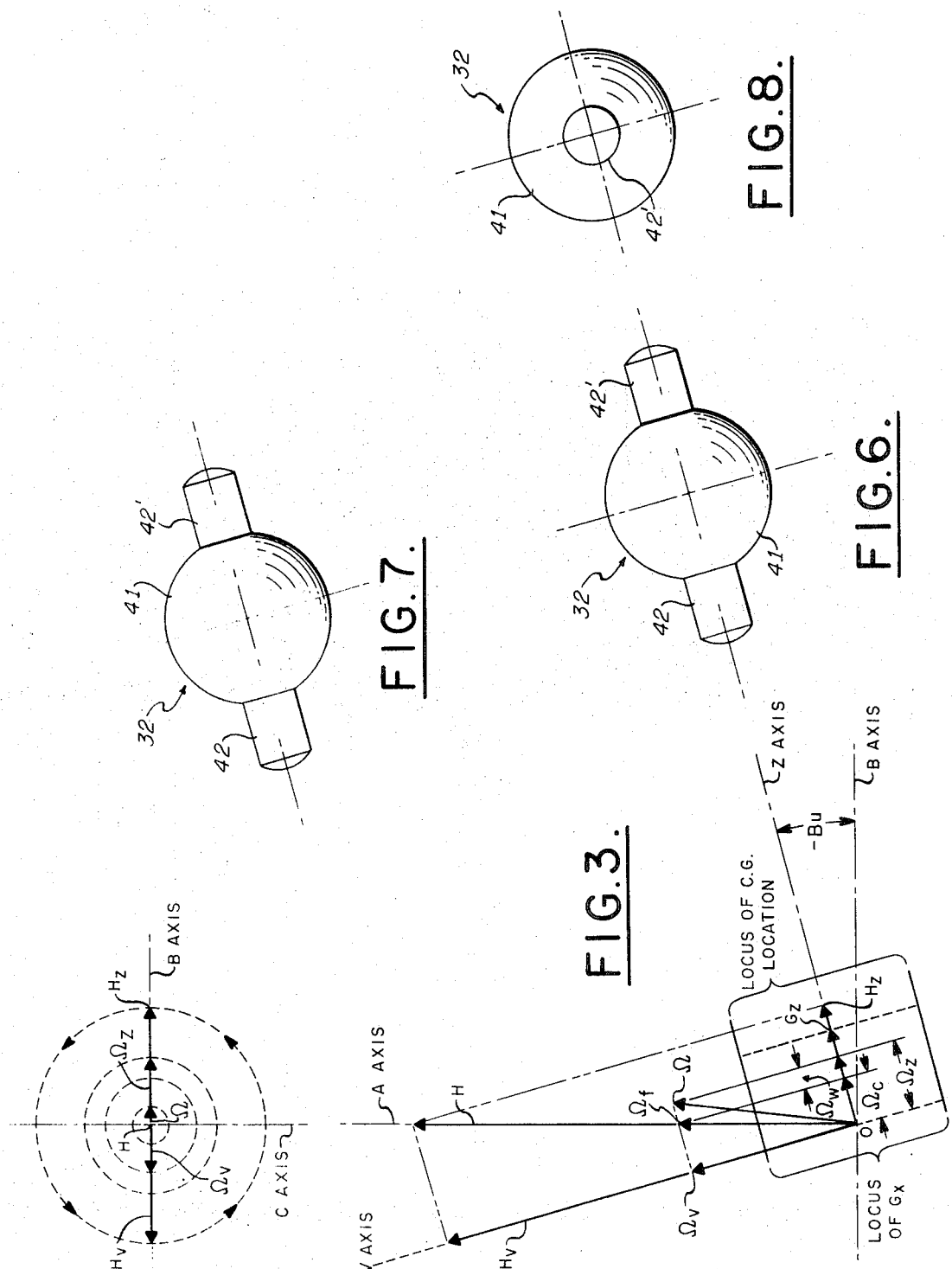

MULTIPLE ROTATION GYROSCOPE

The present invention relates to gyroscopie apparatus and particularly to improving the accuracy of gyroscopic devices by providing continuous automatic compensation of any center of gravity shift in the inertial element of gyroscopic devices and to elimination of coercive torques imposed by the inertial element support mechanism.

The accuracy of a gyroscopic device is usually defined as a certain level of drift rate or random wander of the gyro spin axis in inertial space. Drift rates are governed by the law $$W = L/H$$

where W is the drift rate, H is the angular momentum of the gyroscopic or inertial element and L is the disturbing torque; each being present on mutually perpendicular axes. Torques can be present from a variety of causes. Two principal sources of coercive torque are inertial element mass unbalance and support bearing coercion.

Previous attempts to measure and compensate for gyroscopic mass unbalance have been complex, expensive and have serious operational limitations. Gimbal reversal techniques do not attenuate drift caused by mass unbalance along the gyro spin axis. Even the free-rotor gyros are subject to the effects of mass unbalance along their spin axes. Angular momentum modulation attempts to compensate for mass unbalance apply comparatively large torques to the gyroscopes for the purpose of modulating the rotational speed of the gyroscope. This produces a number of problems such as:

a. the large torques applied to the gyroscope usually possess undesired coercive components, b. rapid changes in speed usually result in large amounts of heat being introduced into the gyroscope causing additional error due to temperature gradients, c. the mass unbalance of the gyroscope may vary with rotational speed caused by centrifugal forces operating on the non-rigid structure of the gyroscope, and d. implementation of the variable rotational speed technique requires the detection of very small angular deviations.

The present invention overcomes the above-mentioned defects possessed by the only other types of gyroscopes which are theoretically capable of compensating for mass unbalance. In addition, the present invention eliminates coercive torques on the inertial element from the support mechanism.

It is therefore a primary object of the present invention to provide extremely accurate gyroscopic apparatus.

It is an additional object of the present invention to provide gyroscopic apparatus which automatically compensates for mass unbalance.

It is a further object of the present invention to provide gyroscopic apparatus in which coercive torques due to its support mechanism are effectively eliminated.

It is another object of the present invention to provide gyroscopic apparatus which continuously and automatically compensates for mass unbalance and support mechanism coercive effects.

These and other objects of the present invention are achieved in gyroscopic apparatus by utilizing a multiple rotation principle that inherently attenuates gyro drift caused by the interaction of all components of acceleration with all components of mass unbalance. The present invention does this by drift averaging at a relatively high frequency and thereby attenuates mass-unbalance drift to negligibly small values. Most other sources of drift are similarly attenuated. The drift attenuation is completely automatic, and adjusts itself both to changing acceleration and to component inperfection. The averaging period can easily be made short enough for short term application. The present invention is the only technique known that can theoretically provide short term averaging of all components of mass unbalance.

These and other objects, features and structural details of the invention will become apparent from the following description and drawings, wherein like reference characters indicate like elements, wherein:

FIG. 3 is a vectorial representation of various momentum and angular velocity vectors taken through a longitudinal section of the rotor of FIG. 1 at an instant of time;

FIG. 4 is a plan view of FIG. 3 with the solid lines representing the vectors of FIG. 3 taken at the same instant of time and the dotted lines representing the loci of the vectors over an extended period of time;

FIG. 6 is an enlarged elevational view of the rotor shown in FIG. 5;

FIG. 7 is a top plan view of the rotor of FIG. 6;

FIG. 8 is a side view of the rotor of FIG. 6; and

Figure 1:
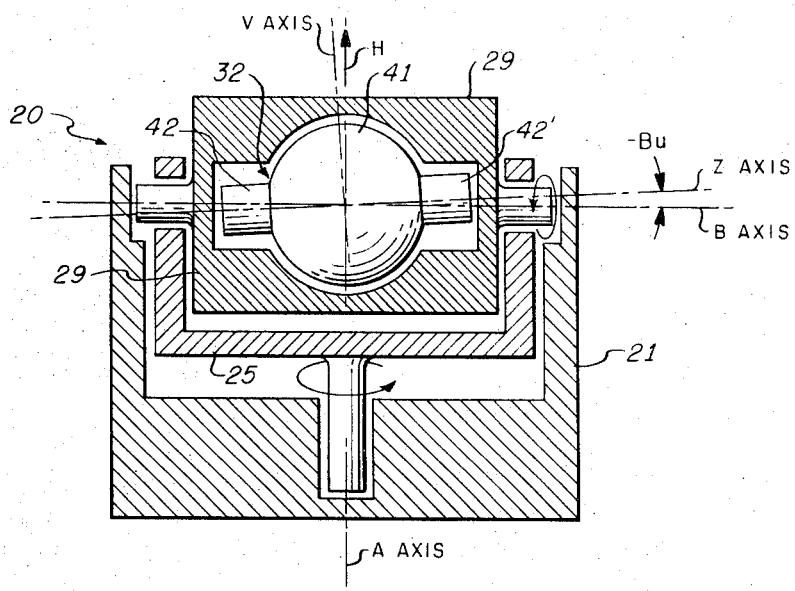
FIG. 1 is a schematic diagram partly in section of a portion of a gyroscope incorporating the multiple rotation motion of the present invention.

To facilitate an understanding of the present invention, a kinematic description of the multiple rotation motion of the present invention will be described by referring to FIG. 1. A two degree of freedom multiple rotation gyroscope 20 has a case 21 within which a gimbal 25 is rotatably supported to spin at a fast rotation speed (for example 12,000 RPM) about an axis A. The gimbal 25 rotatably supports a cup 29 which is spun at a slow rotation speed (for example 180 RPM) with respect to the gimbal 25 about an axis B that is perpendicular to the axis A. The cup 29 in turn contains and rotatably supports an inertial sensitive element or rotor 32 which rotates in synchronism with the cup 29 in the steady state condition. The rotor 32 may be hydrostatically supported within the cup 29 which may be hydrostatically supported within the gimbal 25 which in turn may be ball bearing or hydrostatically supported within the case 21 utilizing either liquid or gas as the working fluid. The rotor 32 and the cup 29 are disposed to rotate synchronously with each other in the steady state condition in a manner to be described and thus the rotor 32 and the cup 29 are both simultaneously rotated about the axes A and B resulting in a multiple rotation motion of the rotor 32 from whence the name multiple rotation gyroscope 20.

In order to achieve the automatic compensation of mass unbalance described above, the moment of inertia of the rotor 32 with respect to the axis A is made greater than the moment of inertia of the rotor 32 with respect to the axis B assuming the axis of symmetry Z of the rotor 32 is aligned with the axis B. This may be accomplished, for example, by adding diametrically opposed cylindrical projections 42 and 42' on opposite sides of the rotor's spherical portion 41 about the rotor axis of symmetry Z assuming the axis Z is aligned with the axis B which is the case when the gyroscope 20 is at rest. Upon starting the gyroscope 20, rotation of the gimbal 25 about the axis A and the cup 29 about the axis B results in the rotor 32 having a motion in its steady state condition in inertial space consisting of a fast angular velocity component about an axis V and a slow angular velocity component about the axis of symmetry Z wherein the axis of symmetry Z of the rotor 32 is disposed at a slight leaning angle Bu from the axis B. The axis V of the rotor 32 is perpendicular to the axis of symmetry Z. The leaning angle Bu is a function of the fast and slow angular velocity magnitudes and the ratio of the moments of inertia of the rotor 32 and is a known predictable angle which remains constant in the steady state condition of the multiple rotation gyroscope 20. Gyro rotor mass unbalance effects that would otherwise cause gyro drift are either attenuated by a factor equal to the sine of the angle Bu or eliminated completely in a manner to be more fully explained. Further gyro coercive forces are either greatly reduced or eliminated in a manner to be explained.

Figure 2:
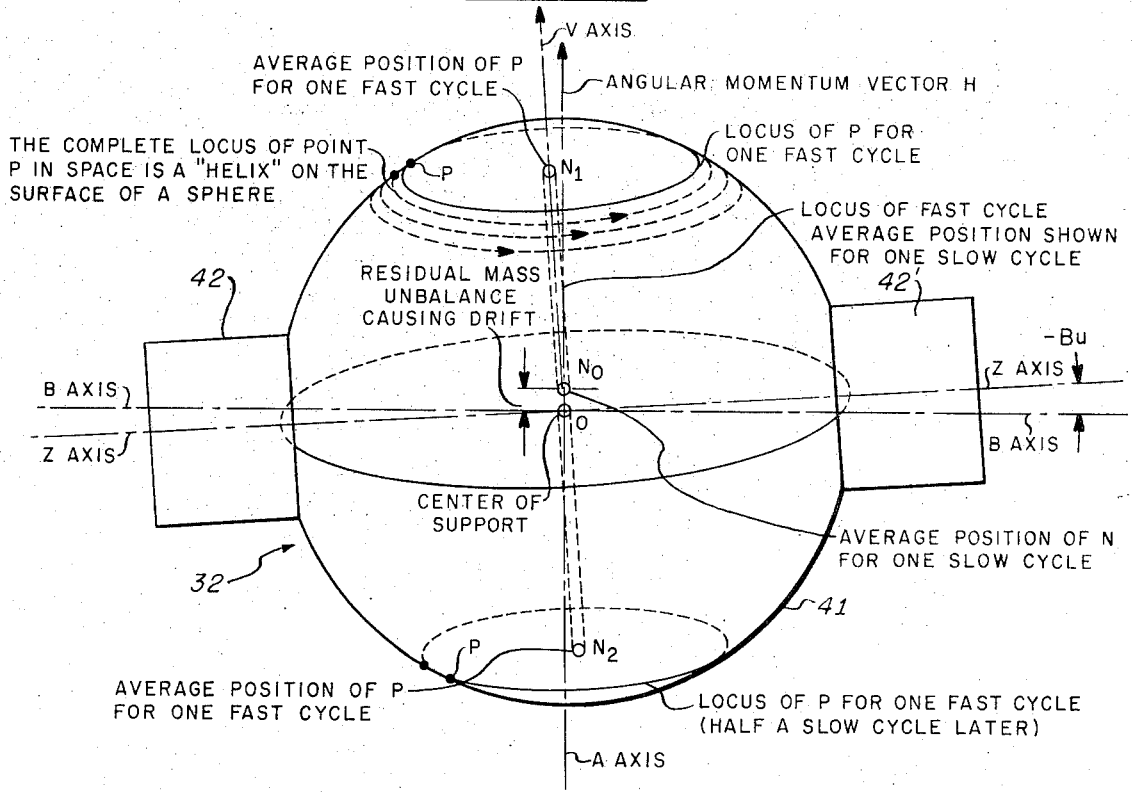
FIG. 2 is an isometric schematic diagram of a gyroscopic rotor which illustrates the mass balancing characteristics of the present invention.

Another way of explaining the drift-attenuating characteristics of the present invention is to describe the space-locus of a point on the surface of the rotor 32 in the steady state condition with the axis of symmetry disposed at a leaning angle Bu with respect to the axis B. Referring to the exaggerated view shown in FIG. 2, assume the rotor 32 is perfectly balanced initially. Then place a deliberate unbalance at point P. The locus of point P for one fast revolution is practically a circle since the slow rotation speed has little influence during one fast cycle. Thus, $N_1$ is the average position of unbalance during a fast cycle. Half a slow cycle later, the average position of unbalance for one fast cycle is $N_2$. Over a full slow cycle, the point N which defines the average fast-cycle position of unbalance of point P describes the locus illustrated in FIG. 2. The average slow-cycle position of the unbalance is at $N_o$, very slightly displaced from the center of support O because of the angle Bu. Therefore, the special motion of the present invention causes the rotor unbalance to have an effective value equal to a small fraction of its physical value. For example, a doubling of the rotor unbalance that would otherwise increase gyro drift from 1.0 to 2.0 degrees per hour, would only increase gyro drift from approximately 0.01 to 0.02 degrees per hour utilizing the present invention.

The multiple rotation motion described above is natural and unforced and thus the angular momentum vector remains fixed in space coincident with the fast spin axis A. A mathematical proof will now be provided referring to FIGS. 3 and 4.

Referring to FIGS. 3 and 4, which are exaggerated for purposes of explanation, the total angular momentum vector H is constant in both magnitude and direction in inertial space. It is the vector sum of two perpendicular components $H_v$ and $H_z$ which rotate about the vector H at the gyroscope's fast rotation speed which is equal to the magnitude of the vector $\Omega_F$. In the plan view FIG. 4, the angular momentum vector H appears as a single point because in this view its two vector components $H_v$ and $H_z$ describe circles of identical radius but opposite direction. The total angular velocity vector $\Omega$ is the vector sum of two perpendicular components $\Omega_v$ and $\Omega_z$ which are exactly coincident with the corresponding angular momentum vectors $H_v$ and $H_z$. Each component of angular momentum is equal to the product of rotational moment of inertia and angular velocity as shown by the equations $$H_v = I_v \Omega_v \quad (1)$$

$$H_z = I_z \Omega_z \quad (2)$$

In the present invention the rotational moment of inertia $I_v$ is constant with respect to rotation about the axis $z$ and is specifically designed to be greater than the rotational moment of inertia $I_z$. Therefore, as shown in Figs. 3 and 4, the angular velocity vector $\Omega$ is not coincident with the angular momentum vector H. All three vectors $\Omega$, $\Omega_r$ and $\Omega_z$ rotate about the vector H at the gyroscope's fast rotation speed $\Omega_F$. Note that in the plan view Fig. 4, all three vectors $\Omega$, $\Omega_v$, and $\Omega_z$ appear as unequal circles whose center is the point representing the vector H in this view. The circle for $\Omega$ may be either larger, smaller, or equal to the circle for $\Omega_r$. However, the circle for $\Omega_z$ must always be larger than the circle for either $\Omega$ or $\Omega_v$.

In the longitudinal section FIG. 3, the fast rotation speed vector $\Omega_F$ can be represented as the vector sum of two perpendicular components $\Omega_v$ mentioned above and $\Omega_c$ which is coincident with $\Omega_z$. The vector $\Omega_z$ minus the vector $\Omega_c$ is designated as the vector $\Omega_w$. An alternate description of the total angular velocity vector $\Omega$ is to describe it as the vector sum of the two non-perpendicular components $\Omega_F$ and $\Omega_w$. In the present invention, the angular velocities $\Omega_F$, the fast rotation speed, and $\Omega_w$, the slow rotation speed, are imposed on the inertial element by the surrounding mechanism. The entire motion of the inertial element is the result of the response of its geometric support and inertial distribution to the two driving motions $\Omega_F$ and $\Omega_w$. In the longitudinal section FIG. 3, the z axis deviates from perpendicularity to the A axis by an angle designated as $-Bu$.

The mathematical relationship between $-Bu$ and the basic parameters of the inertial device is derived below.

Since the components $H_v$ and $H_z$ shown in FIG. 4 are equal and opposite $$-I_v \Omega_v \sin Bu = I_z \Omega_z \cos Bu \quad (3)$$

Since the fast rotation speed $\Omega_F$ is the sum of two perpendicular components $\Omega_v$ and $\Omega_c$ shown in FIG. 3

$$\Omega_v = \Omega_F \cos Bu \quad (4)$$

$$\Omega_c = \Omega_F \sin Bu \quad (5)$$

and by definition $$\Omega_z = \Omega_c + \Omega_w \quad (6)$$

Substituting equations 4, 5, and 6 into equation 1 gives $$-I_v \Omega_F \cos Bu \sin Bu = I_z(-\Omega_F \sin Bu + \Omega_w)\cos Bu \quad (8)$$

Cancelling the cosine terms and collecting the sine terms gives $$-(I_v - I_z)\Omega_F \sin Bu = I_z \Omega_w \quad (9)$$

Placing the equation in a more convenient form $$\sin(-Bu) = \frac{\Omega_w}{\left(\frac{I_v}{I_z} - 1\right)\Omega_F} \quad (10)$$

Equation 10 functions as an equilibrium condition by giving the leaning angle $-Bu$ as a function of the ratio of inertias and the ratio of driving speeds. A further analysis will now be presented to demonstrate the stability of the motion of the inertial element.

It is well-known in the theory of two degree of freedom gyroscopes that two equilibrium conditions exist: an unstable condition when kinetic energy is a minimum and a stable condition when kinetic energy is a maximum. It will be shown below that $I_v$ greater than $I_z$ gives a maximum kinetic energy which implies a stable condition of equilibrium.

Symmetry causes the z axis and axis to be principal axes of inertia of the gyroscope. Therefore, kinetic energy is given by $$K.E. = \tfrac{1}{2} I_v \Omega^2_v + \tfrac{1}{2} I_z \Omega^2_z \quad (11)$$

Since the fast rotation speed $\Omega_F$ is the sum of two perpendicular components $\Omega_v$ and $\Omega_c$ shown in FIG. 3

$$\Omega_v = \Omega_F \cos Bu \quad (12)$$

$$\Omega_c = -\Omega_F \sin Bu \quad (13)$$

and by definition $$\Omega_z = \Omega_c + \Omega_w \quad (14)$$

Substituting equations 12, 13 and 14 into equation 11 gives $$K.E. = \tfrac{1}{2} I_v \Omega^2_F \cos^2 Bu + \tfrac{1}{2} I_z(\Omega^2_F \sin^2 Bu - 2\Omega_F \Omega_w \sin Bu + \Omega^2_w) \quad (15)$$

Collecting terms in convenient form $$K.E. = \tfrac{1}{2} I_v \Omega^2_F + \tfrac{1}{2} I_z \Omega^2_w - (I_v - I_z)/2\, \Omega^2_F \sin^2 Bu - I_z \Omega_F \Omega_w \sin Bu \quad (16)$$

The equation for both the maximum and minimum values of kinetic energy can be obtained by differentiating kinetic energy with respect to $\sin Bu$ and equating the derivative to zero.

$$d(K.E.)/d(\sin Bu) = -(I_v - I_z)\Omega^2_F \sin Bu - I_z \Omega_F \Omega_w = 0 \quad (17)$$

Equation 17 can be rearranged to give an equation identical with the leaning angle equation 10 in the previous derivation.

$$\sin(-Bu) = \frac{\Omega_w}{\left(\frac{I_v}{I_z} - 1\right)\Omega_F} \quad (18)$$

It is possible to determine whether the above condition is a maximum or minimum by differentiating equation 17 again $$d^2(K.E.)/d(\sin Bu)^2 = -(I_v - I_z)\Omega^2_F \quad (19)$$

If the second derivative is negative the extremum is a maximum and if the second derivative is positive the extremum is a minimum. Therefore, equation 19 shows that the equilibrium condition described by equation 18 has maximum kinetic energy when $I_v$ is greater than $I_z$ and has minimum kinetic energy when $I_v$ is less than $I_z$. Since the maximum kinetic energy condition is the only one that is stable, the inertial element is specifically designed with its $I_v$ greater than $I_z$ in accordance with the present invention.

The motion described above will greatly attenuate unbalance of the center of gravity of the inertial element when the magnitude of the leaning angle Bu is small. The general order of magnitude of Bu is usually less than one degree for aircraft. Constructional unbalance in the inertial element is the distance between the center of gravity C.G. and the center of rotation O as shown in FIG. 3. Inertial element unbalance is the vector sum of two perpendicular components $G_z$ and $G_X$. $G_z$ is coincident with the vector $\Omega_z$ while $G_X$ rotates about the vector $G_z$ at the gyroscope's slow rotation speed $\Omega_w$. Note that $G_z$ remains coincident with $\Omega_z$ throughout the entire complex motion of the inertial element but $G_X$ is coincident with $\Omega_v$ for only an instant of time during each of its revolutions about $\Omega_z$. Therefore, the longitudinal section FIG. 3 shows $G_z$ as a definite vector but both the C.G. location and $G_X$ are shown only as the loci of points in their respective planes which are perpendicular to $G_z$.

If a steady acceleration is applied parallel to the H vector then the rotation of the inertial element about the H vector will place the average location of the center of gravity at the center of rotation with respect to this particular acceleration. In this case the rotation $\Omega_w$ about $\Omega_z$ is not necessary to achieve the desired performance. However, if the steady acceleration is applied perpendicular to the H vector, then the rotation $\Omega_w$ of the inertial element about $\Omega_z$ greatly reduces the center of gravity unbalance. In this case the $G_X$ component of unbalance is cancelled out by its rotation $\Omega_w$ about $\Omega_z$. The only component of unbalance with respect to horizontal acceleration is the projection of $G_z$ on the H vector. Reference to FIG. 3 shows this to be given by the equation HORIZONTAL UNBALANCE = $G_z \sin(-Bu)$ (20)

Therefore, reducing the leaning angle Bu reduces the effect of mass unbalance on the gyroscope when it is subjected to a steady horizontal acceleration. This entire phenomena is a unique characteristic of the present invention.

Figure 5:
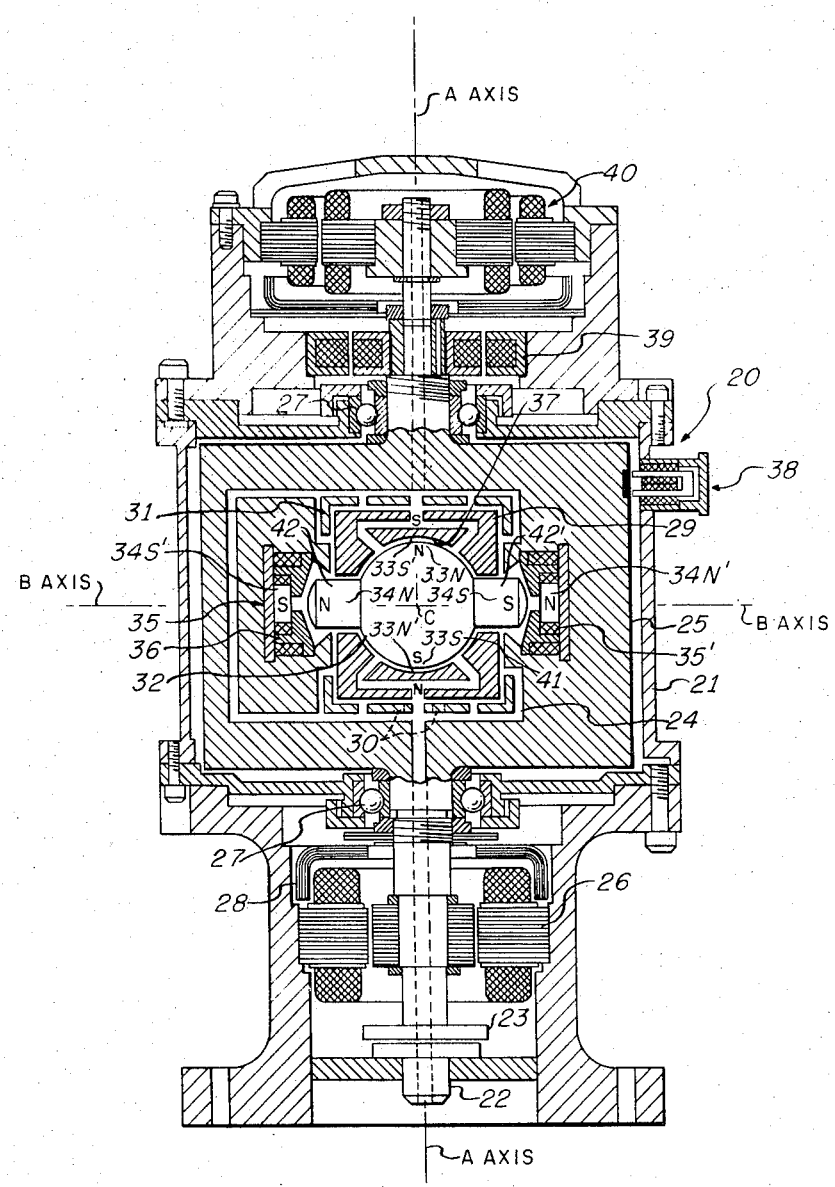
FIG. 5 is a longitudinal section of a two degree of freedom gyroscope embodying the present invention with parts of the drawing in elevation.

With reference now to FIG. 5, the present invention will be described in a typical environment. A two degree of freedom multiple rotation gyroscope 20 is shown to include a housing or case 21 that may be suitably fixed to an inertial platform (not shown) that is stabilized about three perpendicular axes. The case 21 includes a pneumatic inlet 22 through a rotating seal 23 to pneumatic conduits 24 which distribute high pressure air from a source (not shown) throughout the gyroscope. The case 21 contains a gimbal 25 spun at a fast rotation speed (for example 12,000 rpm) with respect to the case 21 about an axis A this is substantially perpendicular to the two axes B and C about which the gyroscope 20 senses rotation. The gimbal 25 may be spun with respect to the case 21 by an electric drive motor 26, air turbine, or other suitable means known in the art. Positioning of the gimbal 25 with respect to the case 21 may be accomplished as shown by ball bearings 27 although it could also be accomplished by hydrostatic, hydrodynamic gas bearings or other suitable means known in the art. The gimbal 25 and all that it contains are protected from stray magnetic fields from the drive motor 26 by the magnetic shield 28.

The gimbal 25 contains a cup 29 spun at a slow rotation speed (for example, 180 rpm) with respect to the gimbal 25 about an axis B that preferably is perpendicular to the axis A about which the gimbal 25 rotates. The cup 29 is spun with respect to the gimbal 25 by a gas jet 30 or other suitable means. Positioning of the cup 29 with respect to the gimbal 25 is accomplished by hydrostatic gas bearings 31 or other suitable means. This kinematic arrangement causes the cup 29 to rotate about the fast rotation axis A in exact synchronism with the gimbal 25 while at the same time the cup 29 also rotates slowly about the axis B which is perpendicular to the axis A.

The cup 29 contains an inertial sensitive element or rotor 32 which rotates in synchronism with the cup 29 in both its fast and slow rotations. The rotor 32 may comprise a sphere or spherical bearing portion 41 having two diametrically opposed cylindrical projections 42 and 42' which are concentric with and define an axis of symmetry Z. Magnetic forces generated by permanent or induced magnets act to keep the cup 29 and rotor 32 resiliently locked together by magnetic attraction. The effective North and South poles are shown in FIG. 5 as N and S. Slow rotational synchronism of the rotor 32 with the cup 29 is maintained by "slow synchronism" magnetic poles 33N and 33S located on diametrically opposed portions of the external surface of the rotor 32 which are cooperative with magnetic poles 33S' and 33N' respectively that are located on diametrically opposed portions of the internal surface of the cup 29. Fast rotational synchronism of the rotor 32 with the cup 29 is maintained by "pick-off torquer" magnetic poles 34N and 34S located on diametrically opposed extremities of the projections 42 and 42' respectively which are cooperative with magnetic poles 34S' and 34N' respectively that are located on diametrically opposed portions of the internal surface of the gimbal 25 and defined by a pick-off and torquer assembly 35 to be more fully described.

Thus a magnetic force tending to maintain the rotor 32 in synchronism with the cup 29 about the axis B is provided by the poles 33N and 33S being cooperative with the poles 33S' and 33N' respectively. A magnetic force tending to maintain the rotor 32 in synchronism with the gimbal 25 about the axis A provided by the poles 34N and 34S being cooperative with the poles 34S' and 34N' respectively. Thus, all angular degrees of freedom of the rotor 32 with respect to the cup 29 are counteracted by magnetic forces. Since the rotor 32 and the cup 29 are both in synchronism with the gimbal 25 about the fast rotation axis, the rotor 32 and the cup 29 are in synchronism with each other. The magnetic poles 33N, 33S, 34N and 34S on the rotor 32 and the magnetic poles 33N' and 33S' on the cup 29 may be formed by locally magnetizing portions of the rotor 32 and cup 29 in accordance with the teachings of U.S. Pat. application Ser. No. 235,721 entitled Magnetized Element, Method of Magnetizing Same and Apparatus for Magnetizing Same of Andrey Polushkin, filed Nov. 6, 1962.

Positioning of the rotor 32 with respect to the cup is accomplished by hydrostatic gas bearings 37 or other suitable means known in the art. This kinematic arrangement causes the rotor 32 to rotate about the fast rotation axis A in synchronism with the gimbal 25 while at the same time the rotor 32 also rotates slowly in a direction almost perpendicular to the axis A at the appropriate leaning angle Bu. The laws of mechanics as embodied in the present invention and explained previously will cause the rotor 32 to seek the characteristic leaning angle Bu automatically. The multiple rotation of both the rotor 32 and the cup 29 will greatly attenuate the acceleration sensitivity of the present invention as described previously in the discussion of the theory. The multiple rotation of the rotor 32 will attenuate effects caused by inertial element mass unbalance and the multiple rotation of the entire support bearing comprising the rotor 32 and the cup 29 will attenuate effects caused by an uncentered support force.

Error signal sensing and gyroscopic torquing with respect to the rotor 32 may be accomplished by utilizing a pickoff and torquing assembly 35 of the type described in U.S. Pat. application 232,713 entitled Gyroscopic Apparatus of Gordon J. Watt, filed Oct. 24, 1962. The motion sensing pickoff consists of a pick-off coil 35' mounted in the gimbal 25 in the equatorial plane of the rotor 32 with respect to the fast rotation axis A and the permanent magnets 34N and S located in the rotor 32. The magnets 34N and S are designed and energized to be rotationally symmetric about the axis B. When the angular momentum vector H is aligned with the gyroscope's fast rotation axis A in the steady state condition, the pole faces of the magnets 34N and S and the pick-off coil 35 remain coplanar throughout each rotation, and there is no pick-off output. When the angular momentum vector H is not aligned but is moving with respect to the axis A in the transient condition, then there is an offset of the plane of rotation of the magnet pole faces 34N and S with respect to the pick-off coil 35. When this happens, those portions of the pick-off coils 35 opposite the magnet pole faces 34N and S sweep back and forth past the pole faces 34N and S, undergoing one cycle of oscillation for each rotation of the gyroscope 20 about the fast rotation axis A. Interaction between the pick-off coil 35 and the magnetic flux generates a sinusoidal electromagnetic force (emf) in the pick-off coil 35 at the fast rotation frequency. The magnitude of the emf is proportional to the fast spin axis misalignment. To complete the misalignment detecting function of the entire pick-off, a reference voltage must be established with which the pick-off signal can be compared in phase. This defines a phase angle between signal and reference which represents the angular coordinates of a pick-off output coded in polar form.

The gyroscope 20 furnishes its own reference by means of a generator 38 located on the case 21. The generator stator has two phases oriented at right angles. This permits it to act as a resolving device operating in synchronism with the rotating gimbal 25. Since the fast rotation axis A of the gyroscope 20 coincides with the angular momentum vector H of the rotor 32 in the normal steady state condition, the pick-off signal may be utilized by a servomechanism (not shown) to bring the entire stabilized platform (not shown) into alignment with the angular momentum vector of the rotor 32 in a well-known manner. The pick-off signal is transmitted from the rotating gimbal 25 to the case 21 by a rotary transformer 39, or other suitable means.

The torquer contains a pair of coils 36 symmetrically disposed in planes parallel to the equatorial plane of the rotor 32 with respect to the fast rotation axis A. When excited with a synchronous current of the proper phase, the torquer coils 36 couple with the magnetic flux emanating from the rotor magnetic poles 34N and S producing a directed torque proportional to current amplitude. When the gyroscope 20 is operated in the torque feedback mode, d-c currents are delivered to the stator of an alternator 40, and are converted to a synchronous a-c current which has a magnitude proportional to the vector sum of the stator currents. The two d-c currents correspond to the angular rate inputs to the two gyroscope axes B and C.

The above structural arrangement employs one pneumatic inlet 22 and discharges air into the ambient conditions surrounding the gyroscope 20. In certain applications it may be desirable to provide an additional pneumatic outlet for use in closed cycle pressurized systems.

With reference now to FIGS. 6 through 8, the construction details of one form of the rotor or inertial element 32 will now be described. Geometrically, the rotor 32 may be composed as described previously or may be made of a spherical bearing portion 41 joined to a smaller cylindrical rod 42 that is coincident with an axis of symmetry z of the sphere and symmetrically disposed about the sphere 41. Either single piece or built up construction may be employed for the rotor. A typical example of built up construction would be a Platinax or Alnico rod inserted through a beryllium sphere having a diametral hole. Another structural variation is a rod whose diameter is greater at the ends than at the region of contact with the sphere. This design increases the ratio of $I_y$ to $I_z$ without changing either sphere diameter or overall diameter along the length of the rod. In general, this method of construction makes possible appreciable ratios of $I_y$ to $I_z$ which as shown by equation (10) may materially reduce acceleration sensitivity of the present invention.

In operation, compressed air is supplied from the source (not shown) to the pneumatic inlet 22 through a rotating seal 23 to pneumatic conduits 24 which distribute high pressure air throughout the gyroscope to the gimbal-case bearings 27, the cup-gimbal bearings 31, and the rotor-cup bearings 37. This supports the working parts of the present invention in correct non-wearing positions with respect to each other by approximately linear pneumatic positioning springs. The gimbal 25 is spun at the fast rotation speed by the electric motor or air turbine 26. Hydrostatic cup-gimbal bearings 31 force the cup 29 to spin in exact synchronism with the gimbal 25 about the fast rotation axis A. An air jet 30 mounted on the gimbal 25 forces the cup 29 to spin at a comparatively slow rate with respect to the gimbal 25 about the axis B perpendicular to the fast rotation axis A. The inertial element or rotor 32 is forced to spin at the fast rotation rate by the magnetic poles 34N and S and at the slow rotation rate by the magnetic poles 33N and S. These two rotations differ from being perpendicular to each other as explained by the small leaning angle Bu. The multiple rotation of both the inertial element or rotor 32 and the supporting cup 29 will attenuate drift caused either by inertial element unbalance or an uncentered support force.

If the angular momentum vector H of the rotor 32 moves from alignment with the fast rotation axis A of the gimbal 25, the magnetic poles 34 will generate an electrical error signal in the pick-off coil 35. As previously described, the error signal will be resolved into the actual error angles about the two degrees of freedom of the gyroscope with the aid of the reference signal generator 38. In turn, these signals may be employed to determine the precession of the inertial platform on which the present invention is mounted until the error signal is zero. In this manner, the present invention may be used to stabilize an inertial platform to the angular momentum vector of the inertial element 32. If the inertial platform requires angular motion with respect to inertial space, this can be provided by feeding electrical torquing signals to the alternator 40 which in turn sends its signals to the torquing coils 36 which act on the magnet 34 to precess the inertial element 32. The stabilized platform will follow the inertial element 32 through the operation of the error sensing servomechanism, in a manner similar to that disclosed in said U.S. Pat. application Ser. No. 232,713, for example.

Figure 9:
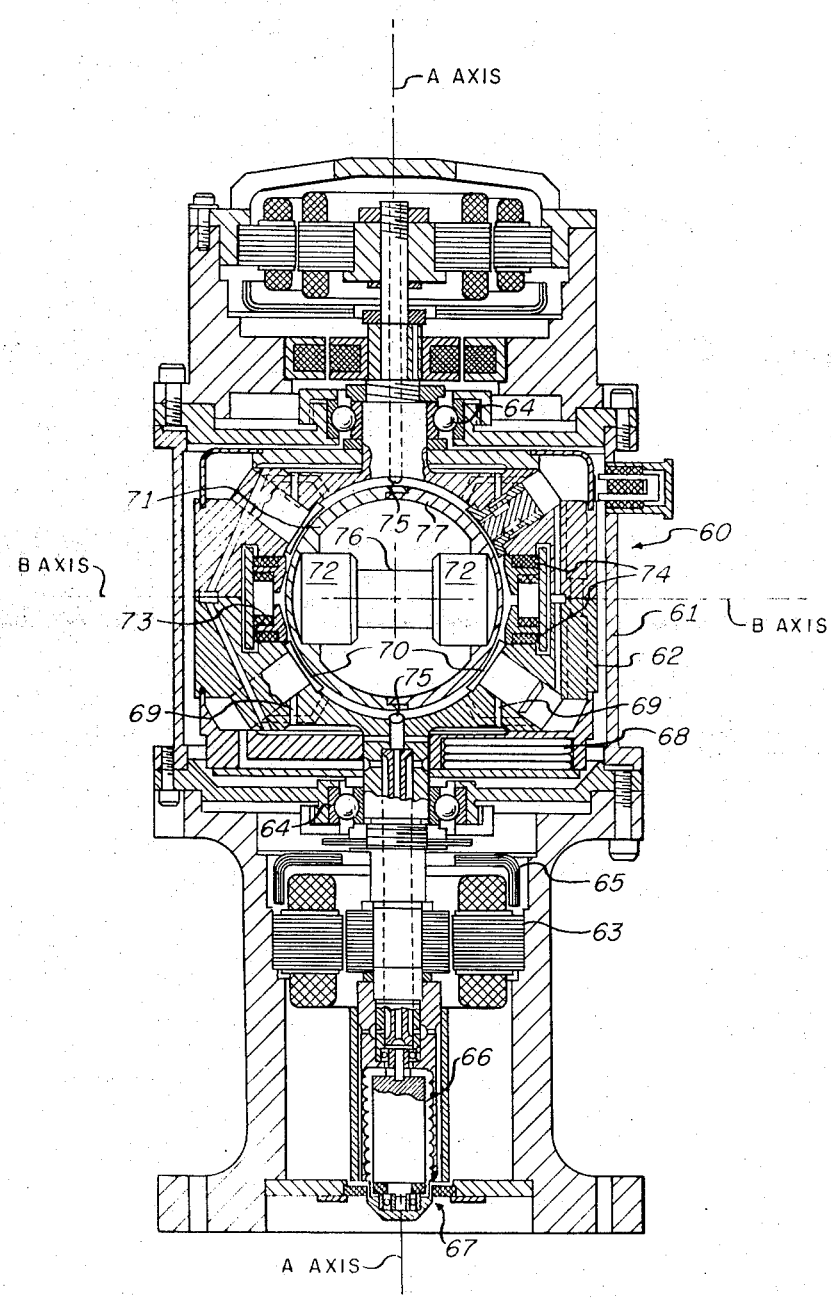
FIG. 9 is a longitudinal section of an alternative embodiment of a two degree of freedom gyroscope incorporating the present invention.

An alternative embodiment of the present invention is shown in FIG. 9 which does not utilize a cup 29. A two degree of freedom multiple rotation gyroscope 60 includes a housing or case 61 that may be suitably fixed to an inertial platform (not shown) that is stabilized about three perpendicular axes. The case 61 contains a gimbal 62 spun at a fast rotation speed with respect to the case (i.e., 12,000 r.p.m.) about an axis A that is substantially perpendicular to the two axes about which the gyroscope senses rotation. The gimbal 62 is spun with respect to the case 61 by an electric motor 63. Positioning of the gimbal 62 with respect to the case 61 is accomplished by a pair of axially spaced ball bearings 64.

A magnetic shield 65 protects the contents of the gimbal 62 from stray magnetic fields. The gimbal 62 contains a completely sealed pressurized liquid system consisting of a fluid pump 66 driven by the gimbal 62 through a magnetic coupling 67, a bellows 68 which regulates liquid pressure by functioning as an accumulator to compensate primarily for temperature induced liquid volume changes, and conduits 69 which transport liquid to and from a hydrostatic liquid bearing 70. The pressurized liquid system may be of the type described in U.S. Pat. application Ser. No. 279,889 of E.S. Rocks entitled Gyroscopic Apparatus filed May 13, 1963. The gimbal 62 also contains an inertial element or rotor 71 which is positioned with respect to the gimbal 62 by the hydrostatic liquid bearing 70. This bearing need exert only a very small force on the rotor 71 because it is maintained in a state of almost neutral buoyancy by the surrounding liquid. Fast rotational synchronism of the rotor 71 with the gimbal 62 is maintained by the pick-off-torquer magnetic poles 72 located in the rotor 71 and the adjacent pick-off 73 and torquer coils 74 located on the gimbal 62 in a manner similar to that described with respect to FIG. 5. The additional slow rotation of the rotor 71 about an axis B perpendicular to its fast rotation axis A is maintained by liquid jets 75 located on the gimbal 62, but directed at the rotor 71. The laws of mechanics as embodied in the present invention will cause the rotor 71 to seek the characteristic leaning angle Bu automatically. The multiple rotation of the rotor 71 will greatly attenuate effects caused by inertial element mass unbalance and deviation of the center of flotation from the center of rotation. Effects caused by an uncentered support force from the hydrostatic bearing 70 are reduced to a small value because it carries a very small fraction of the total force exerted by the rotor 71. Most of this force is carried by the flotation liquid.

The techniques of error signal sensing and gyroscopic torquing employed in this alternative embodiment may be the same as in the embodiment of the present invention shown in FIG. 5.

The embodiment of FIG. 9 discloses an alternative form of construction for the rotor 71. It is a built up rotor consisting of a dumbbell shaped heavy metal magnet 76 extending through the entire rotor 71 along its axis of symmetry Z and a hollow light metal sphere 77 to form the "bearing" and flotation chamber. The sphere 77 may be fabricated of beryllium and the magnet 76 of a material having a much higher density and a similar temperature coefficient of expansion such as alnico of platinax. In the rotor 71 design illustrated in FIG. 9 the magnetized portions do not extend beyond the surface of the sphere while in the previous rotor 32 design the magnetized portions extended well beyond the surface of the sphere. Both techniques of construction must satisfy the requirement that $I_v$ be appreciably greater than $I_z$.

In operation, electric power is supplied to the motor 63 which proceeds to rotate the gimbal 62 at an increasingly rapid speed. As the gimbal 62 accelerates, the fluid pump 66 pumps liquid under pressure through the hydrostatic liquid bearing 70 to hold the rotor 71 in correct non-wearing position with respect to the gimbal 62. When steady operating conditions are reached, the gimbal 62 is spinning at the fast rotation speed. The rotor 71 is forced to spin at the fast rotation rate by the magnetic poles 72 and at the slow rotation rate by liquid jets 75 located in the gimbal 62 which results in the axis of symmetry Z of the rotor 71 assuming its characteristic leaning angle Bu with the attendant benefits described above.

Although the physical construction of this alternate embodiment of the present invention differs from the previously described instrument, its operation with respect to error sensing, torquing etc. is identical.

The following will explain the reduction of the acceleration induced errors caused by misalignment of the resultant support force with the average location of the center of gravity which is approximately the geometric center of the rotor. If a steady acceleration is applied perpendicular to the angular momentum vector H, the slow rotation at speed $\Omega_w$ of the supporting bearing greatly reduces the center of support unbalance. With the axis B of slow rotation of the supporting cup perpendicular to the angular momentum vector H, the average location of the center of support of the cup portion of the bearing is at the center of rotation with respect to this particular acceleration. The average location of the center of support of the inertial element portion of the air bearing is almost at the center of rotation with respect to this particular acceleration. It differs by a magnitude of distance that can be approximated by the distance between geometric and mass centers of the inertial element multiplied by the sine of the angle (−Bu) resulting in an appreciable reduction in the drift rate.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In gyroscopic apparatus,
   a an inertial element having a first axis of inertial symmetry and a second axis perpendicular to said first axis,
   b the moment of inertia of said element with respect to said second axis being greater than that with respect to said first axis,
   c said inertial element being supported for rotation about said first and second axes simultaneously,
   d means for simultaneously rotating said inertial element about said first axis at a first angular velocity component and about said second axis at a second angular velocity component appreciably greater than said first angular velocity component for providing a spatial reference.

2. In gyroscopic apparatus,
   a an inertial element having a first axis of inertial symmetry and a second axis perpendicular to said first axis,
   b the moment of inertia of said element with respect to said second axis being greater than that with respect to said first axis,
   c said inertial element being supported for rotation about said first and second axes simultaneously
   d means for simultaneously rotating said inertial element about said first axis at a first angular velocity component and about said second axis at a second angular velocity component appreciably greater than said first angular velocity component for providing a spatial reference, and
   e means cooperative with said inertial element for providing a signal representative of the relative deviation of said reference with respect to a predetermined axis.

3. In gyroscopic apparatus,
   a an inertial element having a first axis of inertial symmetry and a second axis perpendicular to said first axis,
   b the moment of inertia of said element with respect to said second axis being greater than that with respect to said first axis,
   c said inertial element being supported for rotation about said first and second axes simultaneously,
   d means for simultaneously rotating said inertial element about said first axis at a first angular velocity component and about said second axis at a second angular velocity component appreciably greater than said first angular velocity component for providing an angular momentum spatial reference normally coincident with a third axis, and e means cooperative with said inertial element for providing a signal representative of the deviation of said angular momentum spatial reference with respect to said third axis.

4. In gyroscopic apparatus,
a an inertial element having a first axis of inertial symmetry and a second axis perpendicular to said first axis,
b the moment of inertia of said element with respect to said second axis being greater than that with respect to said first axis,
c said inertial element being supported for rotation about said first and second axes simultaneously,
d means for simultaneously rotating said inertial element about said first axis at a first angular velocity and about said second axis at a second angular velocity appreciably greater than said first angular velocity, and
e pick-off means cooperative with said inertial element for providing a signal representative of the deviation of said inertial element from a predetermined axis.

5. In an inertial device,
a an inertial element having a first moment of inertia with respect to a first axis and a second moment of inertia with respect to a second axis perpendicular to said first axis,
b said second moment of inertia being greater than said first moment of inertia,
c said inertial element being supported for rotation about said first and second axes simultaneously,
d and means for simultaneously tending to rotate said inertial element about said first axis at a first angular velocity and about said second axis at a second angular velocity appreciably greater than said first angular velocity,
e said first and second moments of inertia and said first and second angular velocities being interrelated whereby the tendency towards multiple rotation of said inertial element inherently compensates for mass unbalance effects of said inertial element and provides an accurate spatial reference.

6. In an inertial device of the character described in claim 5 wherein said first and second moments of inertia and said first and second angular velocities are interrelated to provide a leaning angle $-Bu$ in accordance with the formula $$\sin -Bu = \frac{\Omega_w}{\left(\frac{I_v}{I_s}-1\right)\Omega_F}$$

where the symbols are defined above in the specification.

7. In an inertial device for accurately defining a spatial reference,
a a substantially spherical rotor having a first moment of inertia with respect to a first axis of inertial symmetry and a second moment of inertia with respect to a second axis perpendicular to said first axis,
b said second moment of inertia being greater than said first moment of inertia,
c said inertial element being supported for rotation about said first and second axes simultaneously,
d means for simultaneously tending to rotate said inertial element about said first axis at a first angular velocity and about said second axis at a second angular velocity appreciably greater than said first angular velocity whereby the rotation of said inertial element inherently compensates for mass unbalance effects of said inertial element thereby accurately defining said spatial reference, and
e means cooperative with said inertial element for providing a signal representative of the relative deviation of said reference with respect to a predetermined axis.

8. In an inertial device for accurately defining a spatial reference,
a a gyroscopic rotor having a first axis of inertial symmetry defining a first moment of inertia and a second axis defining a second moment of inertia perpendicular to said first axis,
b said rotor being inertially asymmetrical with its moment of inertia with respect to said second axis being greater than that with respect to said first axis,
c said rotor being supported for rotation about said first and second axes simultaneously,
d first driving means tending to rotate said rotor about said first axis at a first angular velocity,
e second driving means tending to rotate said rotor about said second axis at a second angular velocity appreciably greater than said first angular velocity,
f said first and second driving means being cooperative for tending to rotate said rotor simultaneously about said first and second axes whereby the interrelation of said first and second moments of inertia and said first and second angular velocities compensates for mass unbalance effects of said rotor to provide an accurate spatial reference.

9. In an inertial device of the character recited in claim 8 wherein
said interrelation of said first and second moments of inertia and said first and second angular velocities causes said rotor to assume a position in the steady state condition wherein its angular momentum vector provides a spatial reference with respect to a predetermined axis, and
means cooperative with said rotor for providing a signal representative of the relative movement of said predetermined axis and said spatial reference.

10. In an inertial device for accurately defining a spatial reference,
a a gyroscopic rotor having a first axis of inertial symmetry defining a first moment of inertia and a second axis defining a second moment of inertia perpendicular to said first axis,
b said rotor being inertially asymmetrical with its moment of inertia with respect to said second axis being greater than that with respect to said first axis,
c said rotor being supported for rotation about said first and second axes simultaneously,
d first driving means for driving about a third axis and tending to rotate said rotor about said first axis at a first angular velocity,
e second driving means for driving about a fourth axis and tending to simultaneously rotate said rotor about said second axis at a second angular velocity appreciably greater than said first angular velocity,
f said first and second moments of inertia and said first and second angular velocities being interrelated whereby initially said first and second axes are aligned with said third and fourth axes respectively and in the steady state condition, said first and second axes are displaced by a slight leaning angle from said third and fourth axes respectively for accurately defining said spatial reference.

11. In an inertial device of the character recited in claim 10 wherein
said interrelation is defined by the following equation $$\sin(-Bu) = \frac{\Omega_w}{\left(\frac{I_v}{I_E}-1\right)\Omega_F}$$

where the symbols are defined in the above specification.

12. In an inertial device of the character recited in claim 10 wherein said spatial reference is the angular momentum vector of said rotor and in the steady state condition coincides with said fourth axis, and means cooperative with said rotor for providing a signal representative of the relative movement of said angular momentum vector and said fourth axis.

13. In gyroscopic apparatus,
a a gyroscopic rotor having a first moment of inertia with respect to a first axis of inertial symmetry and a second moment of inertia with respect to a second axis perpendicular to said first axis,
b said rotor being inertially asymmetrical with its moment of inertia with respect to said second axis being greater than that with respect to said first axis,
c a first member for rotatably supporting said rotor,
d a second member for rotatably supporting said first member for rotation about a third axis initially coincident with said first axis,
e said second member being rotatably supported for rotation about a fourth axis initially coincident with said second axis,
f first driving means for rotating said first member about said third axis at a first angular velocity whereby said rotor tends to be rotated about said first axis at said first angular velocity,
g second driving means for simultaneously rotating said second member about said fourth axis at a second angular velocity appreciably greater than said first angular velocity whereby said rotor tends to be rotated about said second axis at said second angular velocity for accurately defining a spatial reference.

14. In gyroscopic apparatus as defined in claim 13 wherein said spatial reference normally coincides with said fourth axis and further including pick-off means having one portion mounted on said rotor and another portion mounted on said second member for sensing relative movement of said spatial reference and said fourth axis.

15. In gyroscopic apparatus as defined in claim 13 further including torquing means cooperative with said rotor for applying controlled coercive torques to said rotor.

16. In gyroscopic apparatus as defined in claim 13 in which said first and second members include hydrostatic fluid bearings for relatively positioning said first and second members and said rotor with respect to each other.

17. In gyroscopic apparatus as defined in claim 13 in which said first driving means tending to rotate said rotor about said first axis includes a fluid jet drive.

18. A method of reducing drift in gyroscopic apparatus including the steps of,
a forming a rotatable gyroscopic inertial element with a first axis of inertial symmetry defining a first moment of inertia and a second axis perpendicular to said first axis defining a second moment of inertia greater than said first moment of inertia,
b rotating said element about said first axis at a first angular velocity,
c and simultaneously rotating said element about said second axis at a second angular velocity appreciably greater than said first angular velocity whereby gyroscopic apparatus is provided in which mass unbalance effects are inherently compensated.

* * * * *